United States Patent
Amir-Siddiqi et al.

(10) Patent No.: US 11,516,299 B1
(45) Date of Patent: Nov. 29, 2022

(54) COMPUTER-BASED SYSTEMS FOR DYNAMIC PERSONA-BASED ACCESS TO COMPUTER NETWORK RESOURCES BASED ON MACHINE LEARNING TECHNIQUES AND METHODS OF USE THEREOF

(71) Applicant: American Express Travel Related Services Co., Inc., New York, NY (US)

(72) Inventors: Nazish Amir-Siddiqi, New York, NY (US); Jeremy D. Seideman, New York, NY (US); Matthew K. Meyer, New York, NY (US); Jillian Smythe, New York, NY (US); Nishit Bandi, New York, NY (US); Mark T. Horton, New York, NY (US); Thomas J. Katavic, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 106 days.

(21) Appl. No.: 16/888,169

(22) Filed: May 29, 2020

(51) Int. Cl.
  *H04L 67/306* (2022.01)
  *H04L 9/40* (2022.01)
  *G06F 40/20* (2020.01)
  *G06N 5/04* (2006.01)
  *G06N 20/00* (2019.01)

(52) U.S. Cl.
  CPC .......... *H04L 67/306* (2013.01); *G06F 40/20* (2020.01); *G06N 5/04* (2013.01); *G06N 20/00* (2019.01); *H04L 63/102* (2013.01)

(58) Field of Classification Search
  CPC .......... G06F 40/20; G06N 5/04; G06N 20/00; H04L 63/102; H04L 67/306
  See application file for complete search history.

(56) References Cited

U.S. PATENT DOCUMENTS

| | | | |
|---|---|---|---|
| 8,326,874 B2 * | 12/2012 | Wright | H04L 63/102 726/21 |
| 9,137,263 B2 * | 9/2015 | Chari | H04L 63/102 |
| 9,628,493 B2 * | 4/2017 | Warshavsky | H04L 63/08 |
| 10,296,753 B2 * | 5/2019 | Brock | G06F 21/6218 |
| 10,554,665 B1 * | 2/2020 | Badawy | H04L 63/0892 |
| 10,742,677 B1 * | 8/2020 | Wu | H04L 63/1408 |

(Continued)

*Primary Examiner* — Thomas J Dailey
(74) *Attorney, Agent, or Firm* — Sterne, Kessler, Goldstein & Fox P.L.L.C.

(57) ABSTRACT

At least some embodiments are directed to a system that receives a profile values associated from new user profiles of a computer network or system. A machine learning system determines a set of existing profiles that share at least one common profile value with the new user profile. A second machine learning model determines a set of existing user entitlements associated with the set of existing profiles. The new user profile is processed by a natural language processing engine to determine a set of new user entitlements from the set of existing user entitlements. The system provides the new user with access to electronic resources of the computer network. The system tracks the new user computer network or system activities and updates the new user profile based on the set of new user entitlements and the new user activity on the computer network or system.

20 Claims, 6 Drawing Sheets

(56) References Cited

U.S. PATENT DOCUMENTS

| | | | |
|---|---|---|---|
| 2012/0246098 A1* | 9/2012 | Chari | G06N 20/00 |
| | | | 706/12 |
| 2016/0057151 A1* | 2/2016 | Brock | H04L 67/02 |
| | | | 726/4 |
| 2016/0294881 A1* | 10/2016 | Hua | H04L 63/102 |
| 2018/0129359 A1* | 5/2018 | Torman | H04L 63/105 |

* cited by examiner

COMPUTER-BASED SYSTEMS FOR DYNAMIC PERSONA-BASED ACCESS TO COMPUTER NETWORK RESOURCES BASED ON MACHINE LEARNING TECHNIQUES AND METHODS OF USE THEREOF

BACKGROUND OF TECHNOLOGY

Many cyberattacks exploit privileged access to computer networks. Limiting or removing privileged access to sensitive applications and data is one of ways to prevent cyberattacks.

SUMMARY OF DESCRIBED SUBJECT MATTER

In some embodiments, the present disclosure provides an apparatus configured to receive a first set of profile values associate with a new user profile of a new user to a computer network. The apparatus inputs the first set of profile values into a first classification machine learning model to determine a set of existing users profiles associated with a plurality of existing users of the computer network, wherein the set of existing users profiles share at least one common profile value with the new user profile. The apparatus inputs a second set of profile values associated with the set of existing users profiles into a second classification machine learning model to determine a set of existing user entitlements associated with the set of existing users profiles. Thereafter, the apparatus inputs the new user profile and a set of entitlement conditions associated with the usage of the computer network into a natural language processing engine to determine a set of new user entitlements from the set of existing user entitlements. The apparatus provides the new user with an access to an electronic resource of the computer network based on the set of new user entitlements; and tracks a new user computer network activity within the computer network based at least in part the set of new user entitlements and update the new user profile based at least in part on: (i) the set of new user entitlements and (ii) the new user computer network activity with the set of the new user entitlements.

In some instances, the apparatus revokes the new user with an access to the electronic resource of the computer network based on the set of new user entitlements when the new user has not accessed the electronic resource of the computer network based on the set of new user entitlements during a time greater than a predetermined time threshold value, and updates the user profile to indicate that the user does not have access to the set of new user entitlements.

In some instances, the apparatus track changes in the computer network to determine when a new electronic resource is added of the computer network and determines a new set of entitlements associated with the usage of the new electronic resource. The apparatus inputs into an inference machine learning model, at least (i) the set of existing users profiles, (ii) the set of existing user entitlements, and (iii) a new set of entitlements to determine when to provide the new set of entitlements to the set of existing users with an access to the new electronic resource of the computer network is at least in part based on the set of new user entitlements.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given about the various embodiments of the present disclosure is intended to be illustrative, and not restrictive.

As used herein the term "entitlement" may refer to an identified right that a user has to a particular system resource, such as a file folder, the use of certain system commands, an amount of storage, read access and/or write access to sensitive data and/or non-sensitive data, and/or services provided via a computer network (e.g., software as a service, enterprise software and/or other suitable type of service provided via a computer network).

As used herein the term "new user entitlements" may refer to entitlements assigned to a user, such entitlements can be existing entitlements in the computer network, new entitlements added to the computer network associated with a new computer network resource. Likewise, "new user entitlements" may refer to a set of entitlements that remain assigned to the user after one or more entitlements have been revoked from the user.

As used herein the term "entitlement condition" may refer to enterprise policies, contracts, regulations and/or any other suitable rule. Enterprise policies may refer to designated enterprise security controls, without specifying technologies, as well as offering high-level directives on acceptable and unacceptable actions to protect critical assets in a computer network. Some examples of policies can include network security policies, Internet access policies, virtual private network policies, port communications policies, firewall rules policies, proxy server policies, secure communication policies, and/or other suitable policies. Enterprise contracts may refer to different agreements held by an enterprise that may result in conflicts of interest when users under a contract acquire rights over certain computer network resources. Enterprise regulations may refer to collectively, the rules and regulations including rules and/or directives made and maintain by an enterprise, industry standards, guidance, and governmental and/or externally mandated regulatory adherence.

FIGS. 1 through 6 illustrate computer based systems and methods for dynamic persona-based access to computer network resources based on machine learning techniques.

Inadequate privileged access management is a technical problem that causes nearly every major security breach. Inadequate privileged access management can open the gateway to the most valuable assets of an enterprise network. Some of the main challenges related to privilege access management systems include how to manage access to data, services, and resources in a dynamic network environment, how to effectively monitor users activities, finding scalable account management solutions, and meeting various policies, contracts, and/or regulations (also referred herein as entitlement conditions).

A technical solution is provided herein by a system that dynamically assigns, augments, revokes, suspends, and/or flags users entitlements for further inspection. The system can modify users entitlements to data and services based on user usage patterns correlated with users roles, user profiles, user status, user responsibilities, data content, disciplinary directions, enterprise standards, enterprise regulations, and/or enterprise policies.

In some embodiments, the system can use historical data, lookalike models, decision trees, and other suitable machine learning models to determine a secure way to manage users entitlements (e.g., assign entitlements, and/or revoke entitlements). The dynamic nature of the embodiments disclosed herein can enable an automated, proactive, and reactive response to the access data and services while ensuring stringent security control and data governance. The system continuously incorporates machine learning feedback loops to provide point in time decisioning regarding the management of entitlements.

Figure 1:
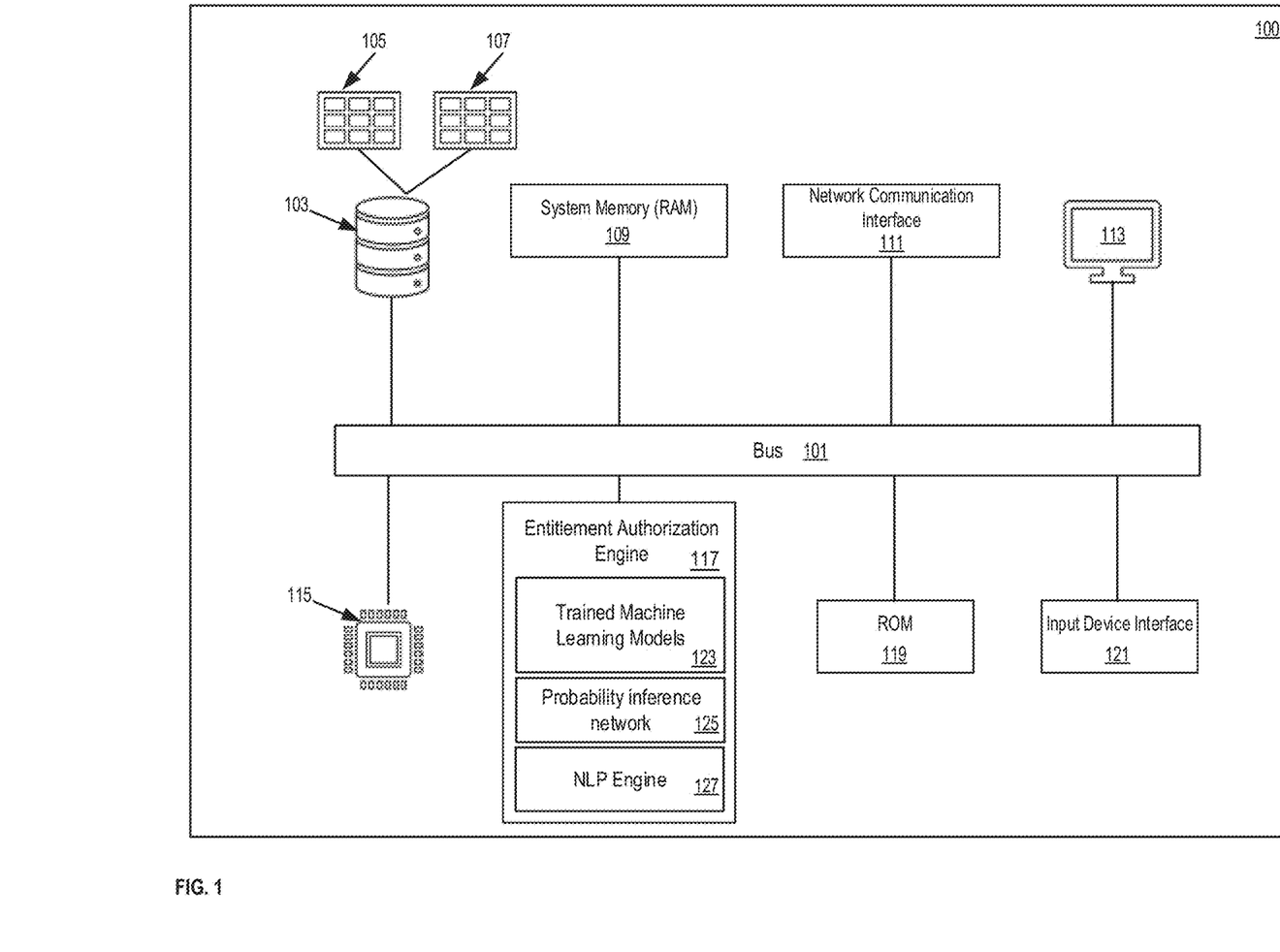
FIGS. 1-6 show one or more schematic flow diagrams, certain computer-based architectures, and/or implementations which are illustrative of some examples of aspects of at least some embodiments of the present disclosure.

FIG. 1 illustrates an example of an implementation of a dynamic persona-based access management system, in accordance with one or more embodiments of the present disclosure. In some embodiments, the dynamic persona-based access management system 100 can include a communication bus 101, a processor 115, an entitlement authorization engine 117, a system memory (RAM) 109, a read-only memory (ROM) 119, a record database 103, an input device interface 121, an output device interface such as display 113, and a network communication interface 111.

In some embodiments, the communication bus 101 collectively represents system peripheral, and/or chipset buses that communicatively connect the numerous internal devices of the system 100. The communication bus 101 may be a physical interface for interconnecting the various components. In some embodiments, the communication bus 101 may be a network interface, router, switch, or other communication interface.

In some embodiments, the system 100 may include a processor 115 configured to perform instructions provided via the bus 101 by, e.g., accessing data stored in memories 109 and 119 via the communication bus 101. In some embodiments, the Read-Only-Memory (ROM) 119 may include a non-volatile storage device, such as, e.g., a magnetic disk hard drive, a solid-state drive, flash memory, or other non-volatile memory and combinations thereof. In some embodiments, system memory 109 may include a volatile memory, such as, e.g., random access memory (RAM) including dynamic RAM and/or static RAM, among other volatile memory devices and combinations thereof. In some embodiments, system memory 109 may store data resulting from processing operations, a cache or buffer of data to be used for processing operations, operation logs, among other data related to the operation of system 100.

In some embodiments, a record database 103 can store data record sets 105 and 107. In some embodiments, the system 100 may receive, store, or have access to multiple data records stored in the record database 103. Data record sets 105 and 107 can include, for example, tracked user activity data within a computer network (e.g., computer network 607 shown in FIG. 6) and tracked changes in the computer network to, for example, determine when a new electronic resource or service is added to the computer network. Such data records can be associated with the same or different users, and/or data and services used in the computer network.

In some embodiments, the entitlement authorization engine 117 can track one or more activities of users of the computer network, new resources added or removed from the computer network such as data, services, and other suitable computer network resources. In some implementations, the entitlement authorization engine 117 can include trained machine learning models 123, probability inference network 125, and Natural Language Processing (NLP) engine 127. Examples of operations executed by the entitlement authorization engine 117 are further described below with reference to FIG. 3, FIG. 4, and FIG. 5.

In some embodiments, a user or administrator may interact with the system 100 via a display 113 and a user input device interface 121. The input device interface 121 may include, e.g., a mouse, a keyboard, a touch panel of the display 113, motion tracking and/or detecting system, or an imaging device, among other input devices. In some implementations, results and statuses related to the system 100 and operations thereof may be displayed to the user via the display 113. For example, in some instances, an administrator can input new user profile to the system 100, and in response, the system 100 can identify and display entitlements associated with the usage of the computer network for the new user. In some other instances, the system can revoke or extend entitlements associated with the usage of the computer network to new and existing users based on new and existing user activities, new resources or services added or removed from the computer network, and other internal or exogenous events that change the state of the computer network.

As shown in FIG. 1, the communication bus 101 can also couple the system 100 to a network (e.g., network 607 shown in FIG. 6) through a network communication interface 111. In this manner, the system 100 can be part of a network of computers (for example a local area network ("LAN"), a wide area network ("WAN"), or an Intranet, or a network of networks, for example, the Internet. Thus, the system 100 can receive inputs and transmit outputs or results to other computing devices via the network communication interface 111.

Figure 2:
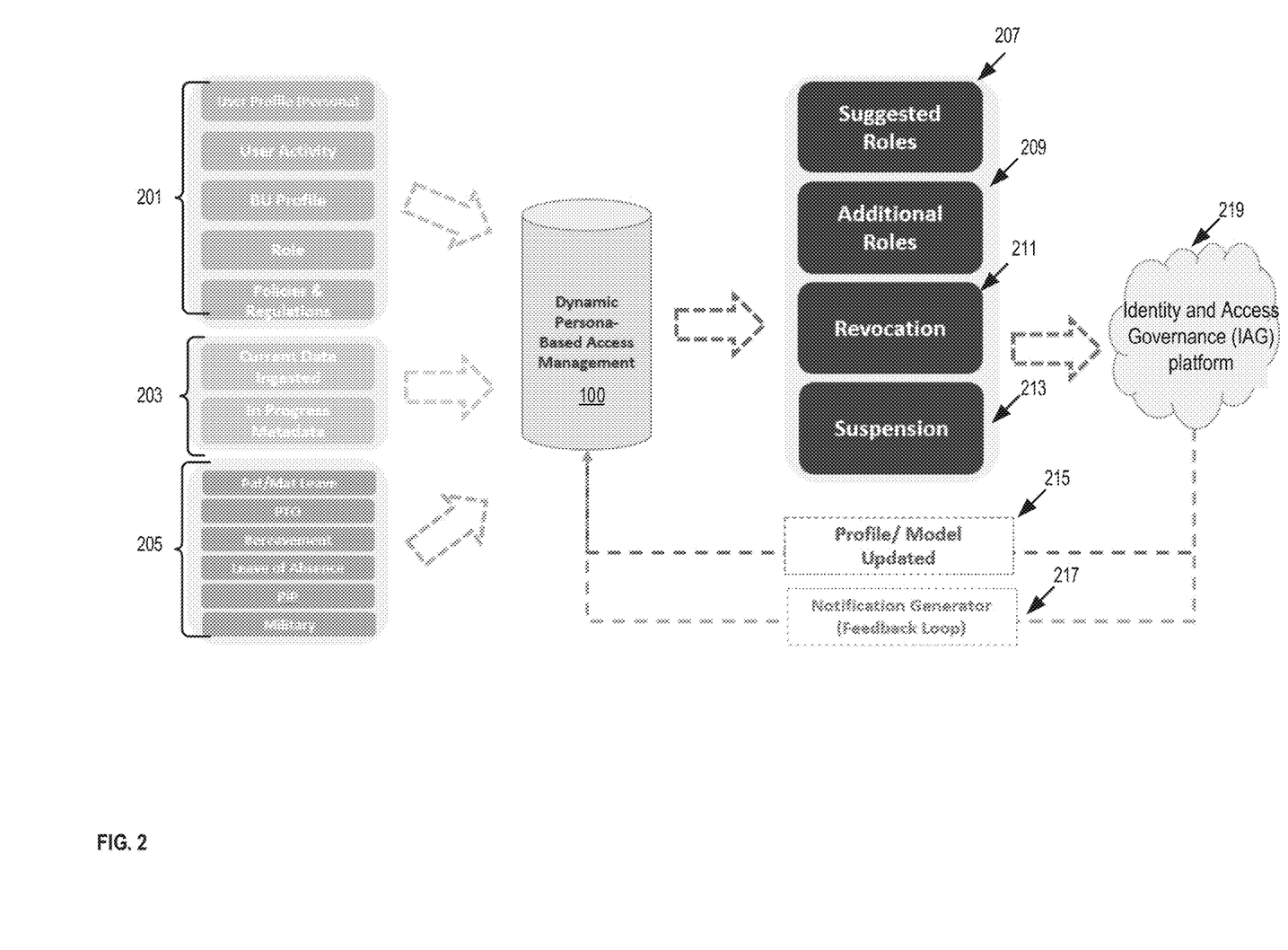

FIG. 2 illustrates an example of inputs and outputs of the dynamic persona-based access management system, in accordance with one or more embodiments of the present disclosure. In some implementations, the system 100 can receive multiple inputs. Some examples of inputs are shown at 201, 203, and 205. Examples of historical or baseline data 201 can include user profile, tracked user activity, business unit profile, user role, enterprise policies, enterprise regulations, and other suitable historical data. Examples of system related data 203 can include data ingested from other systems within the computer network, metadata, and other suitable system related data. Examples of employee status data 205 can include parental leave, paid time off (PTO), bereavement, leave status, absence status, performance improvement plan, military service status, and other suitable employee status data.

In some embodiments, inputs 201, 203, and 205 are received by the system 100. The system 100 processes the inputs to generate outputs including suggested user roles or entitlements 207, user additional roles or entitlements 209, revocation of entitlements including data and services 211, suspension of entitlements 213 resulting in denying user access to data or services of the computer network.

In some embodiments, outputs 207, 209, 211, and 213 can be send to an identity access governance (IAG) system 219 to update a user profile to include outputs 207, 209, 211, and 213. In some instances, the IAG system 219 can send a signal to the system 100 indicating that the user profile 215 was successfully updated. In some other instances, the IAG can send a signal to the system 100 indicating that the update to the user profile 217 was unsuccessful or denied. In some embodiments, signals 215 and 217 can be used to update the system 100, for example, by retraining the trained machine learning models 123 and/or the probability inference network 125 shown in FIG. 1.

Figure 3:
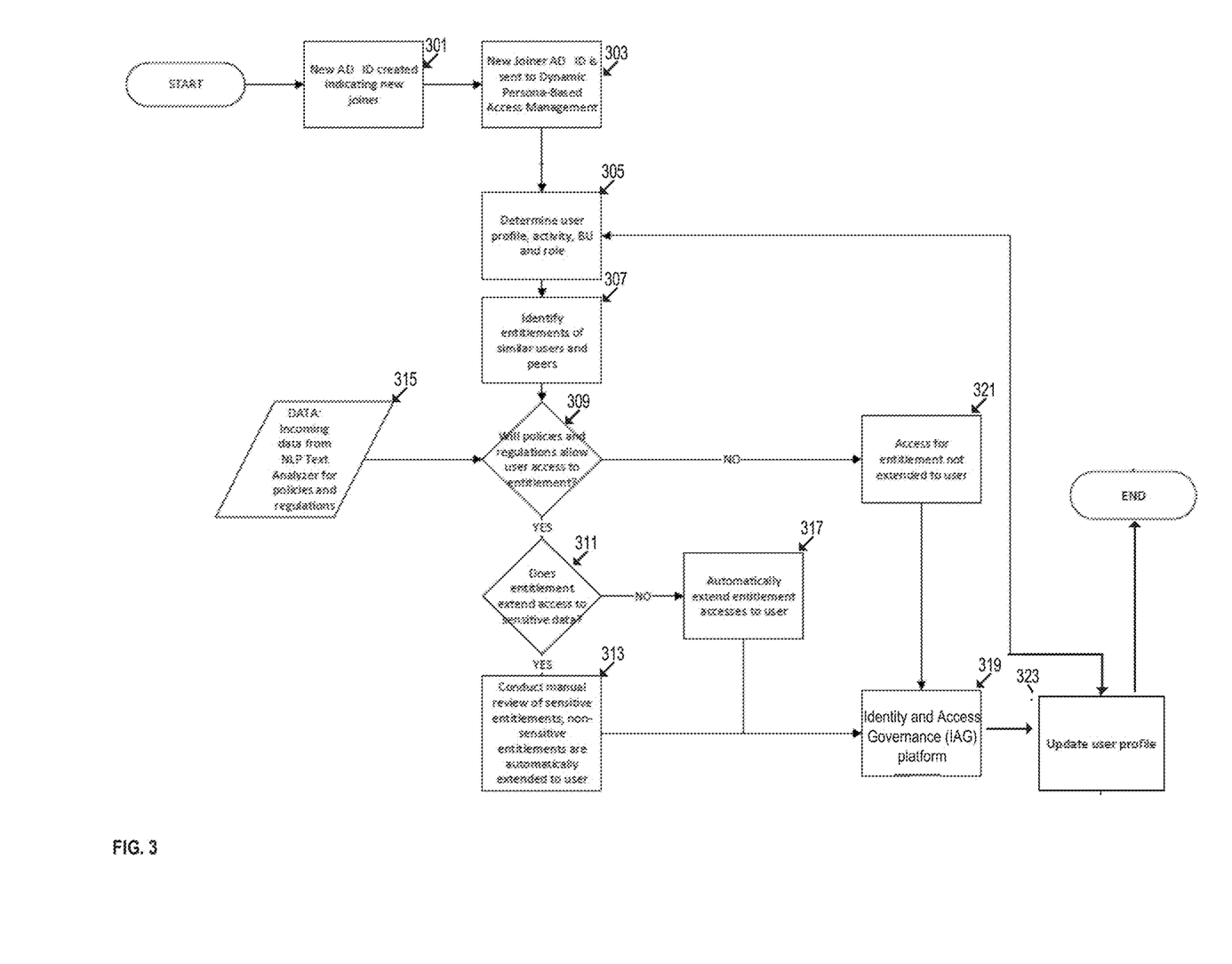
Figure 4:
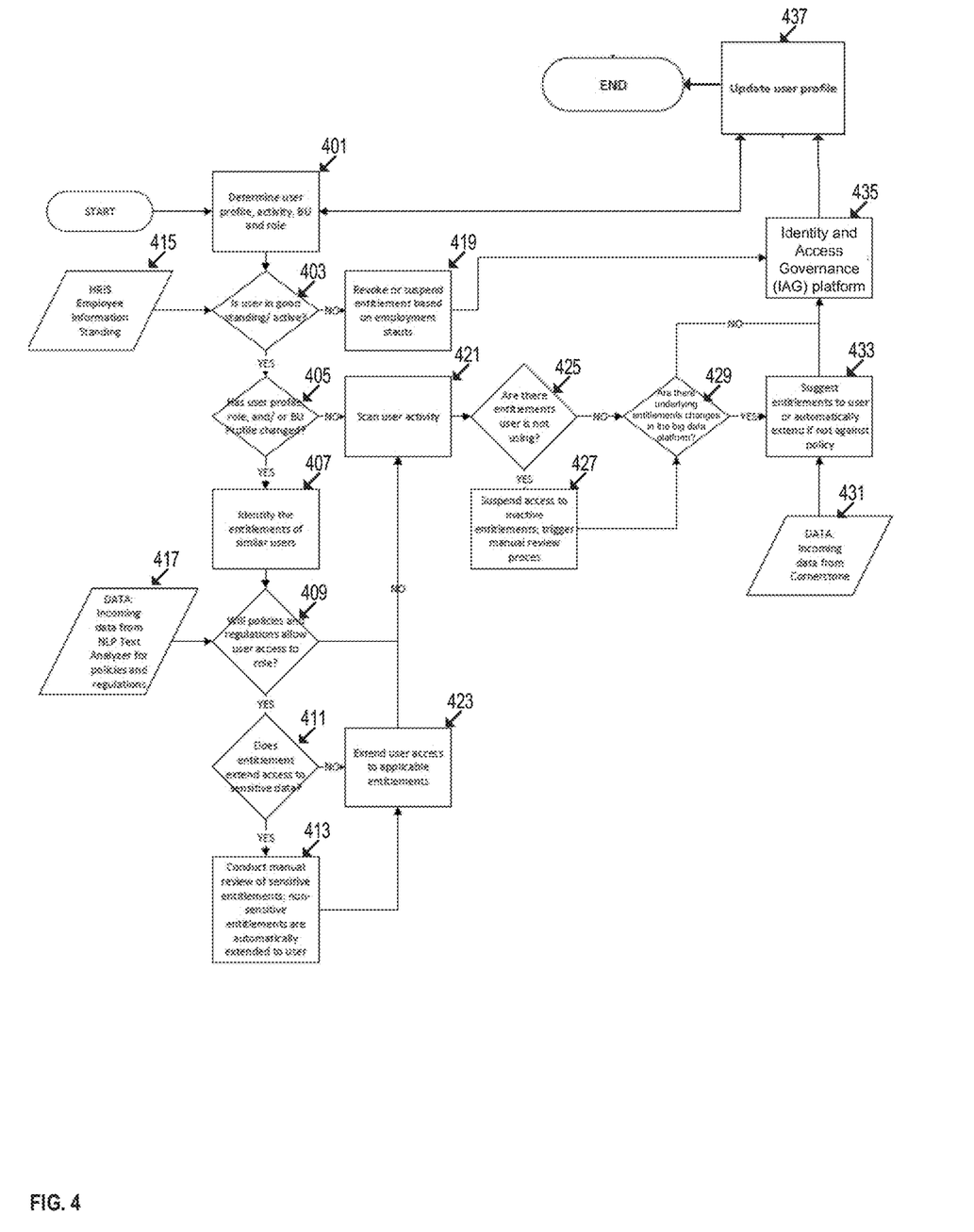
Figure 5:
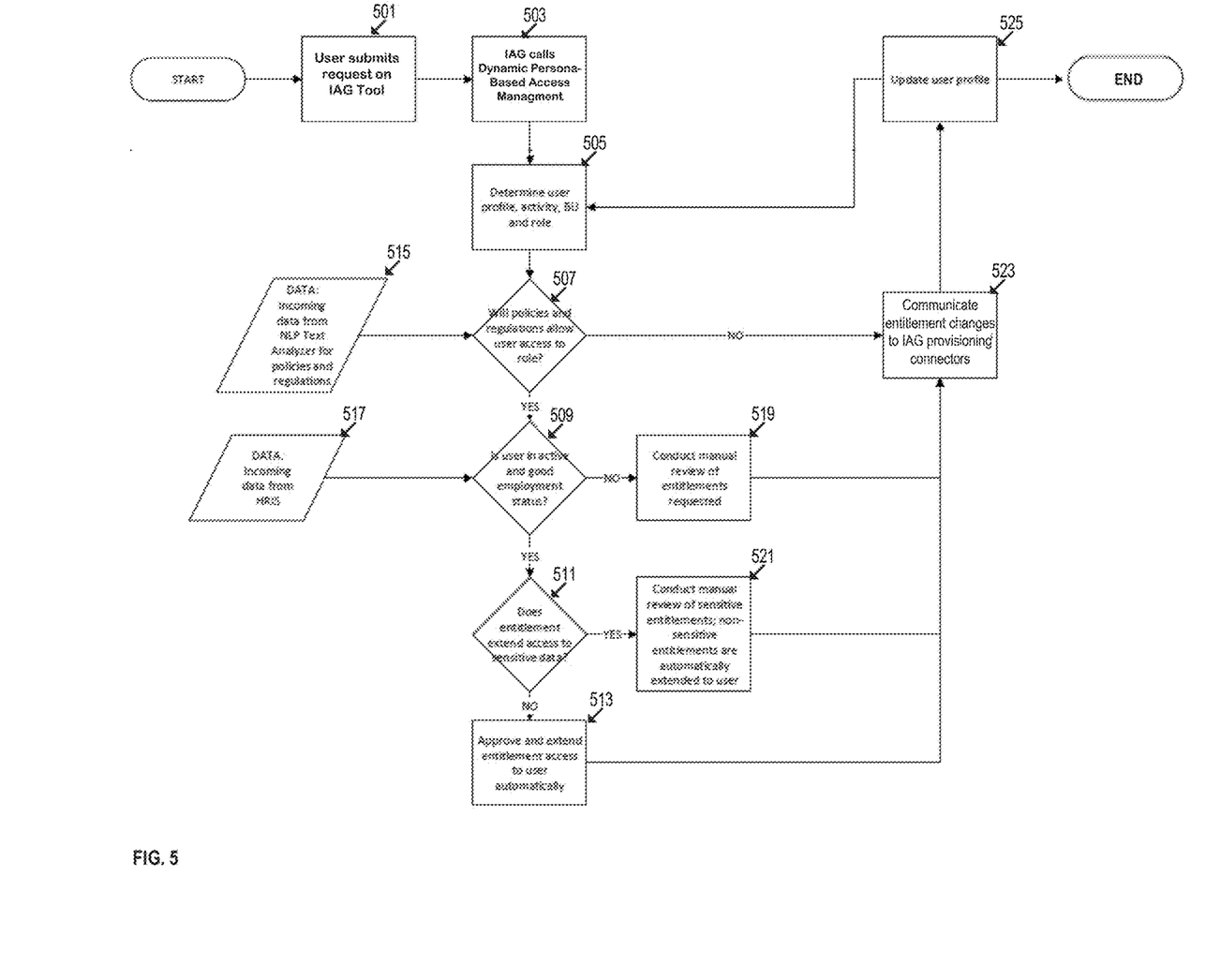

The flowcharts illustrated on FIG. 3, FIG. 4, and FIG. 5 show the functionality of some of the trained machine learning models 123, the probability inference network 125, and the NLP engine 127. In some implementations, the machine learning models 123 can be trained using unsupervised or supervised learning techniques. Examples of raw data that can be used to train such models can include raw data fed into the system 100 from other systems, via data feeds in near real-time from a variety of databases, logs, web analytics systems, data management systems, systems of record, and other similar sources connected to the computer network. In some instances, required data is made available to the system 100 in batches, and near real-time.

In some embodiments, a feature extraction engine, can extract predictive features from the raw data as shown in the examples below:

"Business Unit" (BU)—this feature can be extracted from an enterprise human resources management system; this feature can predict whether certain business units should have (or lack) specific entitlements based on regulatory environment and business unit's function;

"Geography"—this feature can be extracted from an enterprise human resources management system; this feature can predict whether certain markets should have specific entitlements based on market specific regulatory environment;

"Job Code"—this feature can be extracted from an enterprise human resources management system; this feature can predict whether certain job functions at certain access band levels should have (or lack) specific entitlements based on regulations and internal policies;

"Employment Status"—this feature can be extracted from an enterprise human resources management system; this feature can predict whether employees with certain employment statuses should have (or lack) specific entitlements based on regulations and internal policies;

"People Leader"—this feature can be extracted from an enterprise human resources management system; this feature can predict whether employees that share a people leader might have similar entitlements based on that employee's job code;

"Entitlements"—this feature can be extracted from an enterprise Identity and Access Management tool; this feature can predict whether the relationships between entitlements can help to predict what entitlements an employee should have (or lack) access;

"Datetime"—this feature can be extracted from an enterprise Monitoring Logs (e.g., data usage log); this feature can predict whether the employee's datetime of access can help to predict whether an employee needs access based on the frequency that the entitlement is leveraged to access data or services;

"Event"—this feature can be extracted from an enterprise Monitoring Logs (e.g., data usage log); this feature can be a good predictor because the employee's events can represent user behavior when accessing data (e.g., sign-in, sign-out, data access attempts, and/or data access success), and will help predict if the employee needs the access based on the frequency that the entitlement is leveraged to access data; and/or "Policies," "Regulations," and "Contracts"—these features can be extracted by the NLP engine 127 to evaluate (based on job code, business unit, and geography) whether policy, regulations, or contracts prohibit access to entitlement; these features can be good predictors because they can determine relationships between entitlements and job code/business unit/market.

In some embodiments, the features mentioned above can be used to train series of lookalike models, and decision trees to determine a user's appropriate entitlements. These models employ machine learning techniques, allowing for their evolution as the user's roles and behavior are monitored and analyzed for patterns, usage, inconsistencies, and "red flags." For example, entitlements can be revoked from a user based on their activity within the computer network e.g., a user has not accessed a resource for longer than a predetermined time. For another example, the user can receive a notification when a new computer network resource (e.g., new data, new services) are available and the system determines that the user may have interest in using the new computer resource.

In some embodiments, the machine learning models comprise in trained machine learning models 123 include lookalike models. Lookalike models can be used, to build, for example, larger groups of people form a segment of group of people. The larger group of people reflects the benchmark characteristics of the segment group of people, known as the seed audience. In the context of providing entitlements, lookalike modeling can be used to reach new prospects users that look like they may or should have similar entitlements.

In some embodiments, the lookalike modeling process can involve joining a relatively small seed of users into a much larger universe of data, known as a reference set. Reference sets can be determined from existing users of the computer network or provided by a data/service provider, a natively system, or a social platform. The seed users are not often enriched with attributes derived from the reference set. The rich data attributes of the reference set are then used as the features within a machine learning model to identify the attributes most predictive of similarity to the seed.

The reference set can then be scored on the individual level based on their similarity to the seed users using these predictive features. Lookalike models can be used to determine a set of existing users that are similar to a new user, Likewise, lookalike models can be used to determine a set of entitlements that are suitable to a new user based on the entitlements provided to users similar as the new user.

In some embodiments, the system 100 takes the entitlements for users in similar situations (e.g. access band level and job function) and builds a profile that can train and inform a lookalike model (e.g. k-nearest neighbor, left-hand side, k-Means, support vector machine, and other machine learning models or techniques). This enables the system 100 to determine, at a given point-in-time, what entitlements should be extended or removed from a user profile. The use of these models can enable the system 100 to evolve over time, using a "feedback loop" of user activities and system decisions, to ensure that access controls are appropriately assigned, maintained, and governed. It is noted that the system 100 can assign and/or revoke different entitlements members of a same team (e.g., two employees from the marketing team holding the same job title may have different entitlements, in part because the entitlements can be assigned or revoked based on individual user activities).

In some embodiments, the trained machine learning models 123 can include a set of trained decision tree models. A decision tree model is a semantic representation of a tree in which: (1) each tree node is connected to a set of possible answers, (2) each non-leaf node is connected to a test that splits its set of possible answers into subsets corresponding to different test results, and (3) each branch carries a test result subset to another node. It is noted that other types of machine learning techniques and machine learning models can equally be used to implement the disclosed system. In some implementations decision trees can be utilized to determine outputs of conditional statements shown in FIG. 3, FIG. 4, and FIG. 5.

In some embodiments, the NLP engine 127 can be configured to execute name entity recognition, sentiment analysis, text summarization, text mining, topic modeling, and other suitable natural language techniques. The NLP engine 127 can be used to translate policies, contracts, and regulations to extend or revoke entitlements from new or existing users of the computer network. In some instances, the NLP engine 127 can be used to determine a set of new user entitlements from existing or new user entitlements available in the computer network.

In some embodiments, once the machine models are trained, the models can be used to make recommendations and rapid decisions for the appropriate roles and responsibilities for new and current users with respect to current and new data, current and new access entitlements, current and new services provided via a computer network. This can be based on, for example, a scoring matrix. A scoring matrix can be designed to measure the similarity between heterogeneously structured references, for example, different users, different entitlements, or other suitable type of structured references. A scoring matrix can identify whether, for example, two references to objects (e.g., entitlements, resources) in an information system are referring to the same object.

In some embodiments, base model recommendations can be provided by lookalike models for identifying users that require similar needs as data and entitlements change. Probability inference network 125 can include rapid decisioning models that can be used to determine with a level of confidence which applications and approval paths are required. Examples of rapid decisioning model can include a Bayesian Network. A Bayesian Network can represent the causal probabilistic relationship among a set of random variables, their conditional dependences, and it provides a compact representation of a joint probability distribution. A Bayesian Network can include two major parts: a directed acyclic graph and a set of conditional probability distributions. The directed acyclic graph can be a set of random variables represented by nodes. A conditional probability distribution can be defined for each node in the graph. In other words, the conditional probability distribution of a node (random variable) can be defined for every possible outcome of the preceding causal node(s). Such outcomes can be used to assign or revoke entitlements from a user based on a calculated probability. It is understood, that other models can equally be used to enable the system 100 to perform rapid decisions.

Some training methods for the above described machine learning models can include a mix of supervised and unsupervised training methods. Supervised training methods leverage historical data to build base models. Unsupervised training methods support new un-labeled and unclassified data, new to data lakes or databases, and users, wherein similar matrices are applied to draw new inferences on appropriate entitlements or removal of entitlements. In some implementations, tuning of the models can include a change, a removal or an addition of logs that will support rebuilding and revising new and existing policies and protocols. In some implementations, the generation of hyperparameters can be performed by leveraging enterprise-wide policies, compliance measures, and security protocols along with other attribution such as user physical location, user tenure within the organization, user total years of education and education specialty, and other suitable policies, compliance measures, and security protocols.

Some examples of training sets are provided below in TABLE 1.

TABLE 1

| Job Title | Job Family Description | BU Code | Entitlements | Employee ID |
|---|---|---|---|---|
| Director | Public Relations | 071 | SERVICE ID 259 | 0000001 |
| Staff | Human Resources | 071 | READ/WRITE DATA 77 | 0000002 |
| Associate | Legal | 033 | ADMINISTRATOR | 0000003 |
| Vice-President | Marketing | 042 | PRIVILEGED: AD-LINUX | 0000004 |

It is understood that the training set can include more attributes and attribute values than the ones shown in examples included in TABLE 1.

In some embodiments, the system 100 can receive one or more inputs for example network ID, employee ID, business unit, geography, job code, employee status, people leader, entitlements, username, user activity by datetime, user activity events, output of the NLP engine 127 (i.e., analyzed policies, regulations, and contracts) and team profile. The system 100 can process such inputs and can generate one or more outputs including updating entitlements associated with a user profile in different scenarios, for example, (i) user extended access to entitlements; (ii) user revoked access to entitlements; (iii) user suspended access to entitlements; (iv) notification to team leaders requiring manual review of entitlements; and (v) notification to user suggesting entitlements. Examples of these scenarios are discussed below with reference to FIG. 3, FIG. 4, and FIG. 5.

FIG. 3 is a flowchart illustrating examples of computations executed by the system 100 related to a new user of the system 100, in accordance with one or more embodiments of the present disclosure. The computations shown in FIG. 3 can be part of an onboarding process, new users can be set up with the required entitlements to perform their job, based on analyzing similar roles within their team and similar teams.

In some embodiment, a new IAG user joiner record can be used to create in a new Active Directory (AD) record, AD identifier is a trigger sent to the system 100 for a common understanding of a new joiner event. The system 100 determines the new user profile, activity, business unit, and role at 305, for example, via an identity and identity and access management system user profile 323. The system 100 can identify entitlements of similar users and peers (e.g., via a lookalike model). The NLP engine 127 can process entitlement conditions (e.g., contracts, policies, and regulations) as shown at 315. Conditional statement 309 determines whether entitlement conditions allow the new user to access the entitlements. If the entitlements conditions allow the new user to access the entitlements, then the conditional statement 311 determines whether the entitlements extend access to sensitive data. If the entitlements do not extend access to sensitive data, the system 100 automatically extends the entitlement access to the new user as shown at 317. However, when the entitlements extend access to sensitive data to the new user, a manual review of sensitive entitlements is performed at 313, and non-sensitive entitlements are automatically extended to the new user. In some instances, when entitlements are changed at 317 or 313, the change of entitlements is communicated to the IAG system at 319 to update the new user profile as shown at 323.

In some instances, when at the conditional statement 309 is determined that the access to the entitlement do not extend to the new user as shown at 321, then the change of entitlements is communicated to the IAG system at 319 to update the new user profile as shown at 323.

FIG. 4 is a flowchart illustrating examples of computations executed by the system 100 related to the extension and revocation of entitlements based on user activities, in accordance with one or more embodiments of the present disclosure. The example shown in FIG. 4 illustrates a scenario when users change teams, roles, or are subject to disciplinary or other actions, in such cases their entitlements can be adjusted accordingly. Additionally, if a user has been assigned with an entitlement and have not used such entitlements, the entitlement may be removed from the user.

In FIG. 4 the system 100 determines a user profile, tracked activity, business unit, and role as shown at 401. In some instances, the information shown at 401 can be retrieved from a user profile 437 stored in an IAG system. The system 100 can then, determine if the user is in good standing or active based on human resources information system (HRIS) as shown at 415. In some instances, when the user is in good standing or active, the system 100 determines whether the user's profile or business unit has changes as shown at conditional statement 405. In some instances, when the user profile or business unit have changed, the system 100 identifies entitlements of similar users as shown at 407.

In some embodiments, the NLP engine 127 can process entitlement conditions (e.g., contracts, policies, and regulations) as shown at 417. Conditional statement 409 determines whether entitlement conditions allow the user to access a new role. In some instances, when the system 100 determines at 409 that the user can access a new role, the system 100 further determines at 411 if new entitlements about to be granted to the user extend access to sensitive data. In some instances, when the new entitlements extend the user access to sensitive data, a manual review of sensitive entitlements is performed at 413 and non-sensitive entitlements are automatically extended to the user. In some instances, when at 411 is determined that the new entitlements do not extend a user access to sensitive data, the system 100 extend the user access to the applicable entitlements as shown at 423.

In some instances, the system 100 can determine at 403 whether the user is in good standing or active. When the user is not in good standing or active, the system 100 can revoke or suspend the user entitlements based on his/her employment status as shown at 419. Thereafter, the system 100 communicates any entitlement changes to the IAG system as shown at 435. Thereafter the IAG system can update the user profile to reflect the changes as shown at 437.

In some instances, when the system 100 determines at 405 that the user role and/or business unit has not changed, the system 100 can scan the user activity as shown at 421. Thereafter, the system 100 determines if there are any entitlements that the user is not using at 425. In some instances when there are entitlements that the user is not using, the system 100 can suspend access to inactive entitlements and/or trigger a manual review process as shown at 427.

In some instances when the system 100 determines at 425 that there are no entitlements the user is not using, the system 100 can determine if there are any changes in the system platform as shown at 429. In some instances, when there are changes in the system platform, for example, incoming data, changes of services, removing data, as shown at 431, the system 100 can suggest new entitlements to the user or automatically extend the new entitlements to the user if there is no policy indicating the opposite as shown at 433. Thereafter, the system 100 can communicate entitlement changes to the IAG system as shown at 435 and the IAG system can update the user profile to reflect the changes as shown at 437.

FIG. 5 is a flowchart illustrating examples of computations executed by the system 100 related to a user requesting access to resources of a computer network, in accordance with one or more embodiments of the present disclosure. The example shown in FIG. 5 illustrates a scenario when a user requests an unassigned entitlement as part of their work duties, in such a case the system can: i) take the request into account for future assignments, and ii) determine if there are any additional entitlements now required for that user role, given the change in the entitlement state.

In FIG. 5 a user submits a request for a new entitlement or role to an IAG system as shown at 501. The IAG system sends a message or calls the system 100 as shown at 503. Thereafter, the system 100 can determine the user profile, activity, business unit, and role as shown at 505 from the IAG user profile shown at 525. The system 100 determines at conditional statement 507 policies and regulations that may allow the user to access a role or new entitlement. Such policies and regulations can be provided by the NLP engine 127 as shown at 515. In some instances, when the system 100 determines at conditional statement 507 that policies and regulations allow the user to have access to a new entitlement or role, the system 100 determines at conditional statement 509 whether the user is active and in good employment status. Accordingly, the system 100 can receive user data from the HRIS as shown at 517 to make an informed decision at 509.

In some instances, when is determined at 509 that the user is active and has a good employment status, the system 100 can determine at 511 whether the requested entitlement extends access to sensitive data. In some instances, when the requested entitlement does not extend access to sensitive data, the system 100 can approve the entitlement and extends the entitlement automatically to the user as shown at 513. Thereafter, the system 100 communicates any user change of role or entitlement to the IAG system as shown at 523 and the IAG system can change or update the user profile at 525.

In some instances, when policies and regulations do not allow a user to access a role or entitlement at 507, the system 100 communicates at 523 to the IAG system of any entitlement change associated with the user and the IAG system can change or update the user profile at 525.

In some instances, when the user is inactive or not in good employment status as determined at 509, a manual review of the requested entitlements can be performed as shown at 519. Thereafter, the system 100 communicates any user change of role or entitlement to the IAG system as shown at 523 and the IAG system can change or update the user profile at 525.

In some instances, when the requested entitlements extend access to sensitive data at 511, the system 100 can send a message to conduct a manual review of sensitive entitlements; non-sensitive entitlements can be automatically extended to the user as shown at 521. Thereafter, the system 100 communicates any user change of role or entitlement to the IAG system as shown at 523 and the IAG system can change or update the user profile at 525.

Figure 6:
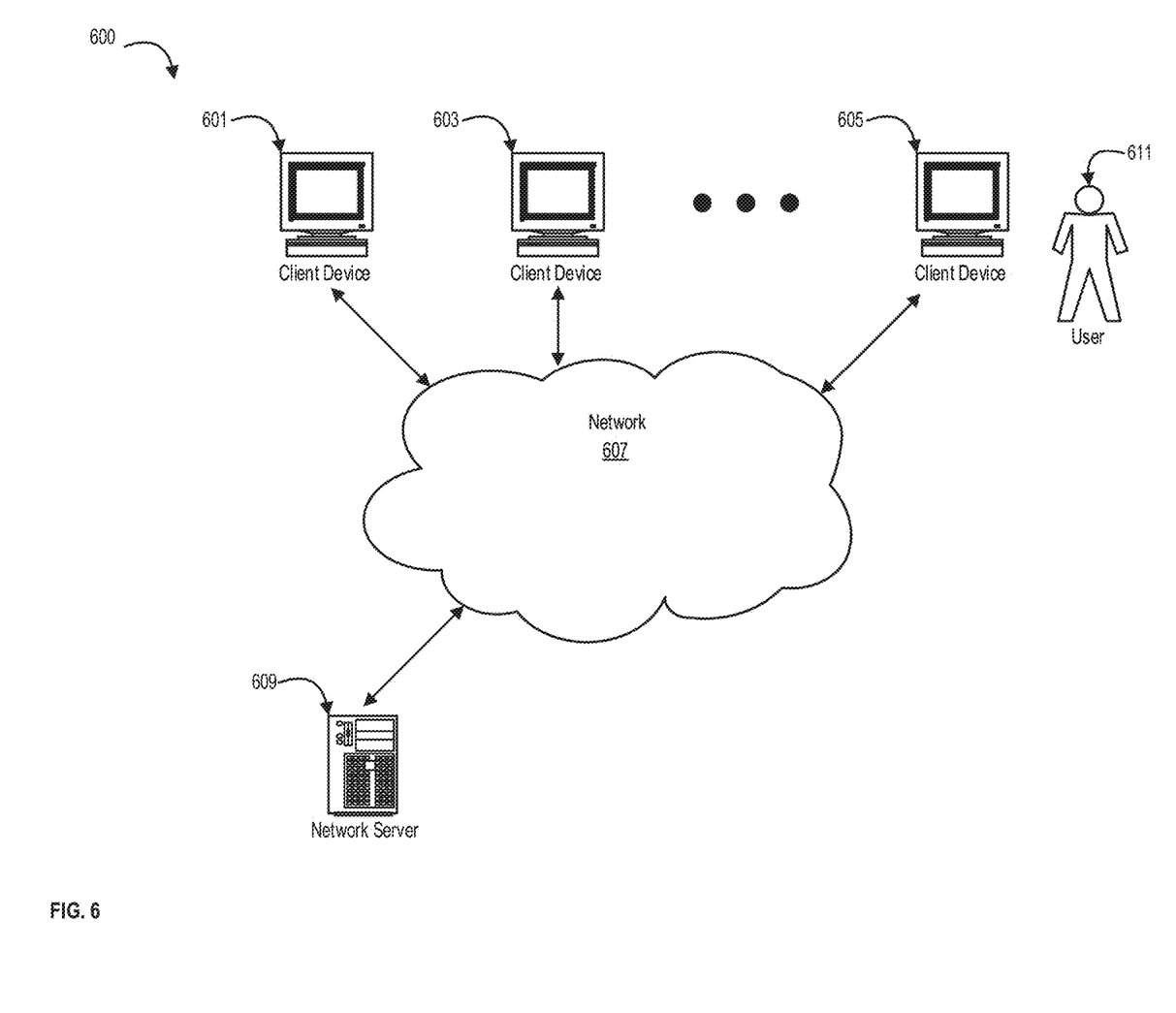

FIG. 6 depicts a block diagram of an example of a computer-based system 600, in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the computing devices and/or the computing components of the computer-based system 600 may be configured to manage large numbers of computing devices and track electronic activities, as detailed herein. In some embodiments, the computer-based system 600 may be based on a scalable computer and/or network architecture that incorporates varies strategies for assessing the data, caching, searching, and/or database connection pooling. An example of the scalable architecture is an architecture that is capable of operating multiple servers.

In some embodiments, computing devices 601, 603, and 605 (e.g., clients) of the computer-based system 600 may include virtually any computing device capable of receiving and sending a message over a network (e.g., cloud network), such as network 607, to and from another computing device, such as server 609, and the like. In some embodiments the dynamic persona-based access management system 100 (discussed with reference to FIG. 1) can be implemented in the network server 609. In some instances, a user 611 in communication with client device 605 can enter inputs and receive outputs from the network server 609 via network 607. In some embodiments, the computing devices 601, 603, and 605 may be personal computers, multiprocessor systems, microprocessor-based or programmable consumer electronics, network PCs, and the like. In some embodiments, one or more computing devices 601, 603, and 605 may include computing devices that typically connect using a wireless communications medium such as cell phones, smart phones, radio frequency (RF) devices, infrared (IR) devices, CBs, integrated devices combining one or more of the preceding devices, or virtually any mobile computing device, and the like. In some embodiments, one or more computing devices 601, 603, and 605 may be devices that can connect using a wired or wireless communication medium, such as a wearable computer, laptop, tablet, desktop computer, video game device, pager, smartphone, ultra-mobile personal computer (UMPC), and/or any other device that is equipped to communicate over a wired and/or wireless communication medium. In some embodiments, computing devices 601, 603, and 605 may run one or more applications, such as Internet browsers, mobile applications, voice calls, video games, videoconferencing, and email, among others. In some embodiments, computing devices 601, 603, and 605 may be configured to receive and to send web pages, and the like. In some embodiments, a browser application of the present disclosure may be configured to receive and display graphics, text, multimedia, and the like, employing virtually any web based language including, but not limited to, Standard Generalized Markup Language (SGML), such as HyperText Markup Language (HTML), a wireless application protocol (WAP), a Handheld Device Markup Language (HDML), such as Wireless Markup Language (WML), WMLScript, XML, JavaScript, and the like. In some embodiments, computing devices 601, 603, and 605 may be specifically programmed by either Java, .Net, QT, C, C++ and/or other suitable programming language. In some embodiments, computing devices 601, 603, and 605 may be specifically programmed to include or execute an application to perform a variety of possible tasks, such as, without limitation, messaging functionality, browsing, searching, streaming or displaying various forms of content, including locally stored or uploaded messages, images and/or video.

In some embodiments, the network 607 may provide network access, data transport and/or other services to any computing device coupled to it. In some embodiments, the network 607 may include and implement at least one specialized network architecture that may be based at least in part on one or more standards set by, for example, without limitation, Global System for Mobile Communications (GSM) Association, the Internet Engineering Task Force (IETF), and the Worldwide Interoperability for Microwave Access (WiMAX) forum. In some embodiments, the network 607 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 607 may include and implement, as an alternative or in conjunction with one or more of the above, a WiMAX architecture defined by the WiMAX forum. In some embodiments and, optionally, in combination with any embodiment described above or below, the network 607 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination with any embodiment described above or below, at least one computer network communication over the network 607 may be transmitted based at least, in part, on one or more communication modes such as, but not limited to: Narrow Band Internet of Things (NBIOT), ZigBee, 3G, 4G, 5G, Global System for Mobile Communications (GSM), General Packet Radio Service (GPRS), WiFi, WiMax, Code Division Multi-access (CDMA), and any combination thereof. In some embodiments, the network 607 may also include mass storage, such as Network Attached Storage (NAS), a Storage Area Network (SAN), a Content Delivery Network (CDN) or other forms of computer or machine-readable media.

In some embodiments, the server 609 may be, for example, a web server (or a series of servers) running a network operating system. In some embodiments, the server 609 may be used for and/or provide cloud and/or network computing. Although not shown in FIG. 6, in some embodiments, the server 609 may have connections to external systems like email, SMS messaging, ad content providers, etc.

In some embodiments, the server 609 may be specifically programmed to perform, in a non-limiting example, as authentication servers, permission management server, search servers, email servers, social networking services servers, financial/banking-related services servers, or any similarly suitable service-base servers for users of computing devices 601, 603, and 605.

In some embodiments and, optionally, in combination of any embodiment described above or below, for example, one or more computing member devices 601, 603, and 605, the server 609, may include a specifically programmed software module that may be configured to send, process, and receive information using a scripting language, a remote procedure call, an email, a tweet, Short Message Service (SMS), Multimedia Message Service (MMS), Instant Messaging (IM), Internet Relay Chat (IRC), mIRC, Jabber, an application programming interface, Simple Object Access Protocol (SOAP) methods, Common Object Request Broker Architecture (CORBA), Hypertext Transfer Protocol (HTTP), Representational State Transfer (REST), or any combination thereof.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "real-time" or "near real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices, and others. In some embodiments, the non-transitory machine-readable medium can include one or more storage devices, and memory devices described above.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or Central Processing Unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

In some embodiments, computer-based systems of the present disclosure may be configured to utilize hardwired circuitry and/or hardware components that may be used in place of or in combination with software instructions to implement latent features extraction consistent with principles of the disclosure. Thus, implementations consistent with principles of the disclosure are not limited to any specific combination of hardware circuitry or hardware components and/or software In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user.

The aforementioned examples are, of course, illustrative and not restrictive.

At least some aspects of the present disclosure will now be described.

In some embodiments, an apparatus of the present disclosure includes a processor and a non-transitory memory storing instructions which, when executed by the processor, cause the processor to perform operations. The processor may receive a first set of profile values associated with a new user profile of a new user to a computer network and input the first set of profile values into a first classification machine learning model to determine a set of existing users profiles associated with a plurality of existing users of the computer network. The set of existing users profiles share at least one common profile value with the new user profile. The processor may input a second set of profile values associated with the set of existing users profiles into a second classification machine learning model to determine a set of existing user entitlements associated with the set of existing users profiles and input the new user profile and a set of entitlement conditions associated with a usage of the computer network into a natural language processing engine to determine a set of new user entitlements from the set of existing user entitlements. The processor may provide the new user with an access to an electronic resource of the computer network based on the set of new user entitlements, track a new user computer network activity within the computer network based at least in part on the set of new user entitlements, and update the new user profile. The new user profile may be updated based at least in part on (i) the set of new user entitlements, and (ii) the new user computer network activity with the set of the new user entitlements.

In some examples, the instructions may further cause the processor to revoke the new user with an access to the electronic resource of the computer network based on the set of new user entitlements when the new user has not accessed the electronic resource of the computer network based on the set of new user entitlements during a time greater than a predetermined time threshold value. The processor may further update the user profile to indicate that the user does not have access to the set of new user entitlements. The decision to revoke the new user with an access to the electronic resource of the computer network may be determined at least in part by the output of a probability inference network. The electronic resource is at least one of a computer network service and computer network data.

In some examples, the instructions may further cause the processor to track changes in the computer network to determine when a new electronic resource is added of the computer network, determine a new set of entitlements associated with the usage of the new electronic resource, and input at least the set of existing user profiles, the set of existing user entitlements, and a new set of entitlements into an inference machine learning model. This determines when to provide the new set of entitlements to the set of existing users with an access to the new electronic resource of the computer network. The determination to provide the new set of entitlements to the set of existing users is determined at least in part by the output of a probability inference network. The new electronic resource is at least one of a computer network service and computer network data.

In another embodiment, a method of the present disclosure includes receiving, by a computing device, a first set of profile values associated with a new user profile of a new user to a computer network and inputting, by the computing device, the first set of profile values into a first classification machine learning model to determine a set of existing users profiles associated with a plurality of existing users of the computer network. The set of existing users profiles share at least one common profile value with the new user profile. The method may input, by the computing device, a second set of profile values associated with the set of existing users profiles into a second classification machine learning model to determine a set of existing user entitlements associated with the set of existing users profiles. The method may input, by the computing device, the new user profile and a set of entitlement conditions associated with a usage of the computer network into a natural language processing engine to determine a set of new user entitlements from the set of existing user entitlements. By the computing device, the method may provide the new user with an access to an electronic resource of the computer network based on the set of new user entitlements, track a new user computer network activity within the computer network based at least in part on the set of new user entitlements, and update the new user profile. The new user profile may be updated based at least in part on (i) the set of new user entitlements, and (ii) the new user computer network activity with the set of the new user entitlements.

In some examples, the method may further include revoking, by the computing device, the new user with an access to the electronic resource of the computer network based on the set of new user entitlements when the new user has not accessed the electronic resource of the computer network based on the set of new user entitlements during a time greater than a predetermined time threshold value. The method may further update, by the computing device, the user profile to indicate that the user does not have access to the set of new user entitlements. The decision to revoke the new user with an access to the electronic resource of the computer network may be determined at least in part by the output of a probability inference network. The electronic resource is at least one of a computer network service and computer network data.

In some examples, the method may further include tracking, by the computing device, changes in the computer network to determine when a new electronic resource is added of the computer network, determining, by the computing device, a new set of entitlements associated with the usage of the new electronic resource, and inputting, by the computing device, at least the set of existing user profiles, the set of existing user entitlements, and a new set of entitlements into an inference machine learning model. This determines when to provide the new set of entitlements to the set of existing users with an access to the new electronic resource of the computer network. The determination to provide the new set of entitlements to the set of existing users is determined at least in part by the output of a probability inference network. The new electronic resource is at least one of a computer network service and computer network data.

In yet another embodiment, a non-transitory computer readable medium of the present disclosures comprises instructions which, when executed by a processor, causes the processor to perform operations. The processor may receive a first set of profile values associated with a new user profile of a new user to a computer network and input the first set of profile values into a first classification machine learning model to determine a set of existing users profiles associated with a plurality of existing users of the computer network. The set of existing users profiles share at least one common profile value with the new user profile. The processor may input a second set of profile values associated with the set of existing users profiles into a second classification machine learning model to determine a set of existing user entitlements associated with the set of existing users profiles and input the new user profile and a set of entitlement conditions associated with a usage of the computer network into a natural language processing engine to determine a set of new user entitlements from the set of existing user entitlements. The processor may provide the new user with an access to an electronic resource of the computer network based on the set of new user entitlements, track a new user computer network activity within the computer network based at least in part on the set of new user entitlements, and update the new user profile. The new user profile may be updated based at least in part on (i) the set of new user entitlements, and (ii) the new user computer network activity with the set of the new user entitlements.

In some examples, the non-transitory computer readable medium may further comprise instructions that cause the processor to revoke the new user with an access to the electronic resource of the computer network based on the set of new user entitlements when the new user has not accessed the electronic resource of the computer network based on the set of new user entitlements during a time greater than a predetermined time threshold value. The instructions may further cause the processor to update the user profile to indicate that the user does not have access to the set of new user entitlements. The decision to revoke the new user with an access to the electronic resource of the computer network may be determined at least in part by the output of a probability inference network.

In some examples, the non-transitory computer readable medium may further comprise instructions that cause the processor to track changes in the computer network to determine when a new electronic resource is added of the computer network, determine a new set of entitlements associated with the usage of the new electronic resource, and input at least the set of existing user profiles, the set of existing user entitlements, and a new set of entitlements into an inference machine learning model. This determines when to provide the new set of entitlements to the set of existing users with an access to the new electronic resource of the computer network. The determination to provide the new set of entitlements to the set of existing users is determined at least in part by the output of a probability inference network. The new electronic resource is at least one of a computer network service and computer network data.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the methodologies, the systems, and the devices described herein can be utilized in any combination with each other. Further still, the various steps may be carried out in any desired order (and any desired steps may be added and/or any desired steps may be eliminated).

The invention claimed is:

1. An apparatus, comprising:
   a processor; and
   a non-transitory memory storing instructions which, when executed by the processor, cause the processor to:
      receive a first set of profile values associated with a new user profile of a new user to a computer network;
      input the first set of profile values into a first classification machine learning model to determine a set of existing users profiles associated with a plurality of existing users of the computer network, wherein the set of existing users profiles share at least one common profile value with the new user profile;
      input a second set of profile values associated with the set of existing users profiles into a second classification machine learning model to determine a set of existing user entitlements associated with the set of existing users profiles;
      input the new user profile and a set of entitlement conditions associated with a usage of the computer network into a natural language processing engine to determine a set of new user entitlements from the set of existing user entitlements;
      provide the new user with an access to an electronic resource of the computer network based on the set of new user entitlements;
      track a new user computer network activity within the computer network based at least in part on the set of new user entitlements; and
      update the new user profile based at least in part on:
         (i) the set of new user entitlements, and
         (ii) the new user computer network activity with the set of the new user entitlements.

2. The apparatus of claim 1, wherein the instructions further cause the processor to:
   revoke the new user with an access to the electronic resource of the computer network based on the set of new user entitlements when the new user has not accessed the electronic resource of the computer network based on the set of new user entitlements during a time greater than a predetermined time threshold value; and
   update the new user profile to indicate that the new user does not have access to the set of new user entitlements.

3. The apparatus of claim 2, wherein a decision to revoke the new user with an access to the electronic resource of the computer network is determined at least in part by the output of a probability inference network.

4. The apparatus of claim 2, wherein the electronic resource is at least one of a computer network service and computer network data.

5. The apparatus of claim 1, wherein the instructions further cause the processor to:
   track changes in the computer network to determine when a new electronic resource is added to the computer network;
   determine a new set of entitlements associated with the usage of the new electronic resource; and
   input into an inference machine learning model, at least:
      (i) the set of existing users profiles,
      (ii) the set of existing user entitlements, and
      (iii) a new set of entitlements,
   to determine when to provide the new set of entitlements to the set of existing users with an access to the new electronic resource of the computer network is at least in part based on the set of new user entitlements.

6. The apparatus of claim 5, wherein the determination to provide the new set of entitlements to the set of existing users is determined at least in part by the output of a probability inference network.

7. The apparatus of claim 5, wherein the new electronic resource is at least one of a computer network service and computer network data.

8. A method comprising:
   receiving, by a computing device, a first set of profile values associated with a new user profile of a new user to a computer network;
   inputting, by the computing device, the first set of profile values into a first classification machine learning model to determine a set of existing users profiles associated with a plurality of existing users of the computer network, wherein the set of existing users profiles share at least one common profile value with the new user profile;
   inputting, by the computing device, a second set of profile values associated with the set of existing users profiles into a second classification machine learning model to determine a set of existing user entitlements associated with the set of existing users profiles;
   inputting, by the computing device, the new user profile and a set of entitlement conditions associated with a usage of the computer network into a natural language processing engine to determine a set of new user entitlements from the set of existing user entitlements;

providing, by the computing device, the new user with an access to an electronic resource of the computer network based on the set of new user entitlements;

tracking, by the computing device, a new user computer network activity within the computer network based at least in part on the set of new user entitlements; and updating the new user profile based at least in part on:
(i) the set of new user entitlements, and
(ii) the new user computer network activity with the set of the new user entitlements.

9. The method of claim 8, further comprising:

revoking, by the computing device, the new user with an access to the electronic resource of the computer network based on the set of new user entitlements when the new user has not accessed the electronic resource of the computer network based on the set of new user entitlements during a time greater than a predetermined time threshold value; and updating, by the computing device, the new user profile to indicate that the new user does not have access to the set of new user entitlements.

10. The method of claim 9, wherein a decision to revoke the new user with an access to the electronic resource of the computer network is determined at least in part by the output of a probability inference network.

11. The method of claim 9, wherein the electronic resource is at least one of a computer network service and computer network data.

12. The method of claim 8, further comprising:

tracking, by the computing device, changes in the computer network to determine when a new electronic resource is added to the computer network;

determining, by the computing device, a new set of entitlements associated with the usage of the new electronic resource; and inputting, by the computing device, into an inference machine learning model, at least:
(i) the set of existing users profiles,
(ii) the set of existing user entitlements, and
(iii) a new set of entitlements,
to determine when to provide the new set of entitlements to the set of existing users with an access to the new electronic resource of the computer network is at least in part based on the set of new user entitlements.

13. The method of claim 12, wherein the determination to provide the new set of entitlements to the set of existing users is determined at least in part by the output of a probability inference network.

14. The method of claim 12, wherein the new electronic resource is at least one of a computer network service and computer network data.

15. A non-transitory computer readable medium comprising instructions which, when executed by a processor, cause the processor to:

receive a first set of profile values associated with a new user profile of a new user to a computer network;

input the first set of profile values into a first classification machine learning model to determine a set of existing users profiles associated with a plurality of existing users of the computer network, wherein the set of existing users profiles share at least one common profile value with the new user profile;

input a second set of profile values associated with the set of existing users profiles into a second classification machine learning model to determine a set of existing user entitlements associated with the set of existing users profiles;

input the new user profile and a set of entitlement conditions associated with a usage of the computer network into a natural language processing engine to determine a set of new user entitlements from the set of existing user entitlements;

provide the new user with an access to an electronic resource of the computer network based on the set of new user entitlements;

track a new user computer network activity within the computer network based at least in part on the set of new user entitlements; and update the new user profile based at least in part on:
(i) the set of new user entitlements, and
(ii) the new user computer network activity with the set of the new user entitlements.

16. The non-transitory computer readable medium of claim 15, wherein the instructions further cause the processor to:

revoke the new user with an access to the electronic resource of the computer network based on the set of new user entitlements when the new user has not accessed the electronic resource of the computer network based on the set of new user entitlements during a time greater than a predetermined time threshold value; and update the new user profile to indicate that the new user does not have access to the set of new user entitlements.

17. The non-transitory computer readable medium of claim 16, wherein a decision to revoke the new user with an access to the electronic resource of the computer network is determined at least in part by the output of a probability inference network.

18. The non-transitory computer readable medium of claim 15, wherein the instructions further cause the processor to:

track changes in the computer network to determine when a new electronic resource is added to the computer network;

determine a new set of entitlements associated with the usage of the new electronic resource; and input into an inference machine learning model, at least:
(i) the set of existing users profiles,
(ii) the set of existing user entitlements, and
(iii) a new set of entitlements,
to determine when to provide the new set of entitlements to the set of existing users with an access to the new electronic resource of the computer network is at least in part based on the set of new user entitlements.

19. The non-transitory computer readable medium of claim 18, wherein the determination to provide the new set of entitlements to the set of existing users is determined at least in part by the output of a probability inference network.

20. The non-transitory computer readable medium of claim 18, wherein the new electronic resource is at least one of a computer network service and computer network data.

* * * * *